(12) United States Patent
Richard

(10) Patent No.: US 7,032,346 B1
(45) Date of Patent: Apr. 25, 2006

(54) FOUNDATION FUMIGATION SYSTEM

(76) Inventor: Calvin Richard, 5241 Grant Ave., Port Arthur, TX (US) 77640

( * ) Notice: Subject to any disclaimer, the term of this patent is extended or adjusted under 35 U.S.C. 154(b) by 311 days.

(21) Appl. No.: 10/122,915

(22) Filed: Apr. 12, 2002

(51) Int. Cl.
*A01M 13/00* (2006.01)

(52) U.S. Cl. .................... 43/125; 43/124; 43/132.1

(58) Field of Classification Search .......... 239/71, 239/208, 209, 207; 52/107; 43/125, 124, 43/132.1
See application file for complete search history.

(56) References Cited

U.S. PATENT DOCUMENTS

| | | | |
|---|---|---|---|
| 2,981,025 A * | 4/1961 | Woodson | 43/124 |
| 3,513,586 A * | 5/1970 | Gushue et al. | 43/124 |
| 3,676,949 A | 7/1972 | Ramsey | |
| 3,782,026 A * | 1/1974 | Bridges et al. | 43/124 |
| 4,742,641 A * | 5/1988 | Cretti | 43/132.1 |
| 4,800,672 A * | 1/1989 | Jackson | 43/125 |
| 4,893,434 A | 1/1990 | Knipp et al. | |
| 4,944,110 A | 7/1990 | Sims | |
| D311,437 S | 10/1990 | Datta et al. | |
| 5,007,197 A * | 4/1991 | Barbett | 43/124 |
| 5,063,706 A * | 11/1991 | Aki et al. | 43/125 |
| 5,317,831 A * | 6/1994 | Fletscher | 43/124 |
| 5,378,086 A * | 1/1995 | Campbell et al. | 405/229 |
| 5,881,494 A * | 3/1999 | Jenkins | 43/124 |
| 6,070,357 A | 6/2000 | Hartill et al. | |
| 6,088,950 A | 7/2000 | Jones | |
| 6,199,770 B1 * | 3/2001 | King et al. | 239/208 |
| 6,463,694 B1 * | 10/2002 | Manciet | 43/124 |

* cited by examiner

*Primary Examiner*—Peter M. Poon
*Assistant Examiner*—David Parsley

(57) ABSTRACT

A foundation fumigation system includes a fumigant container assembly. The fumigant container assembly contains a quality of fumigant to be applied around a foundation of a structure. The fumigant container assembly has a valve portion for selectively releasing the fumigant. A distribution control and monitoring assembly is operationally coupled to the fumigant container assembly. The distribution control and monitoring assembly facilitates the distribution of the fumigant. A distribution system is operationally coupled to the distribution control and monitoring assembly. The distribution system has at least one distribution member environmentally couplable to the fumigant container assembly. The distribution member facilitates distributing the fumigant around the foundation. The distribution system has a plurality of nozzle members. Each one of the nozzle members is in environmental communication with the distribution member. The plurality of nozzle members facilitates application of the fumigant to a surface area proximate to the foundation.

4 Claims, 2 Drawing Sheets

FOUNDATION FUMIGATION SYSTEM

BACKGROUND OF THE INVENTION

1. Field of the Invention

The present invention relates to fumigation systems and more particularly pertains to a new foundation fumigation system for providing a system that could be used to prevent termites, carpenter ants, cockroaches, and various other insects from establishing nests in wood frame houses and other structures.

2. Description of the Prior Art

The use of fumigation systems is known in the prior art. U.S. Pat. No. 3,676,949 describes an insecticide distribution system consisting of a pipe system having an inlet and an outlet and a plurality of nozzles along the pipe. Another type of fumigation system is U.S. Pat. No. 6,070,357 describing a termite control system for treating an underlying area of a slab wherein a plurality of apertured distribution lines are arranged to offset a plurality of negative pressure and flow gradients of others of the distribution lines to uniformly enhance the coverage of the area treated. U.S. Pat. No. 6,088,950 describes a structural pest control system that kills insects in the exterior walls of architectural structures, and the apparatus for doing so. U.S. Pat. No. 4,944,110 describes an integrated pest control system utilizing lengths of small diameter closed end flexible tubing with periodically spaced perforations having open ends terminating at junction boxes. U.S. Pat. No. 4,893,434 describes a pest exterminating system for exterminating pests. U.S. Pat. No. Des. 311,437 describes an ornamental design for a gas pressure regulator.

SUMMARY OF THE INVENTION

The object of the present invention is to provide a new foundation fumigation system that would be its efficiency, unobtrusive design, convenience, and improved level of protection it could provide.

Another object of the present invention is to provide a new foundation fumigation system that would reduce pest control costs by eliminating the need for tenting.

To this end, the present invention generally comprises a fumigant container assembly. The fumigant container assembly contains a quality of fumigant to be applied around a foundation of a structure. The fumigant container assembly has a valve portion for selectively releasing the fumigant. A distribution control and monitoring assembly is operationally coupled to the fumigant container assembly. The distribution control and monitoring assembly facilitates the distribution of the fumigant. A distribution system is operationally coupled to the distribution control and monitoring assembly. The distribution system has at least one distribution member environmentally couplable to the fumigant container assembly. The distribution member facilitates distributing the fumigant around the foundation. The distribution system has a plurality of nozzle members. Each one of the nozzle members is in environmental communication with the distribution member. The plurality of nozzle members facilitates application of the fumigant to a surface area proximate to the foundation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
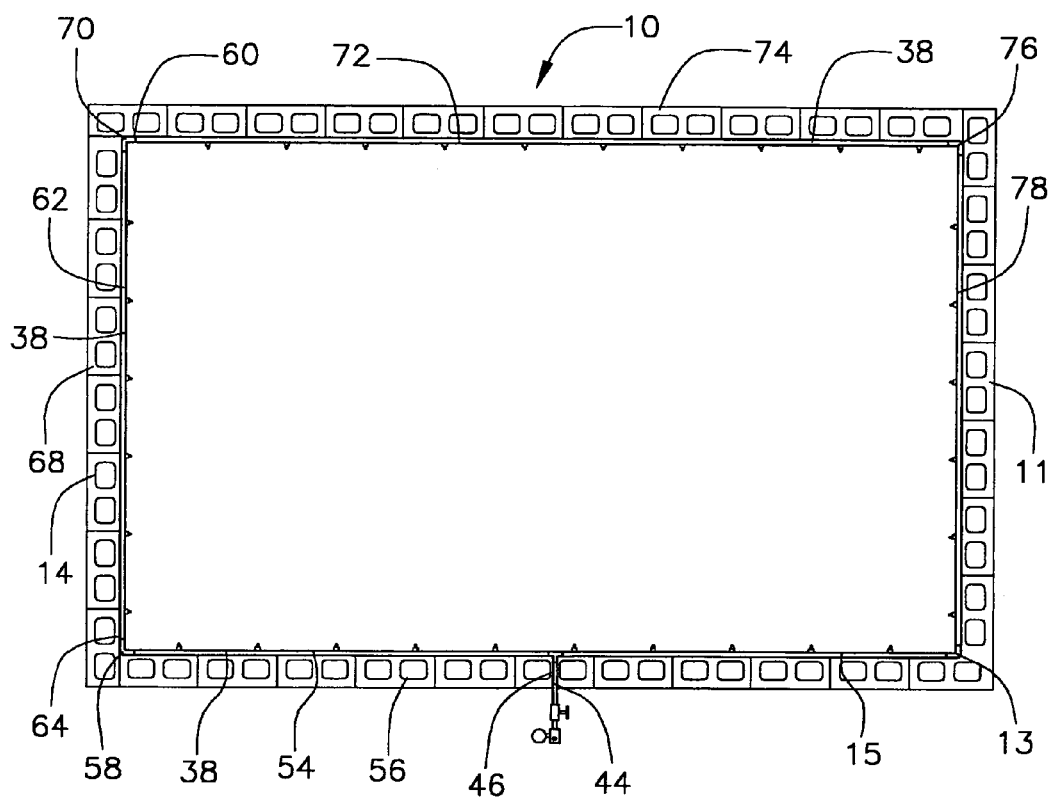
FIG. 1 is a top view of a new foundation fumigation system according to the present invention.
Figure 2:
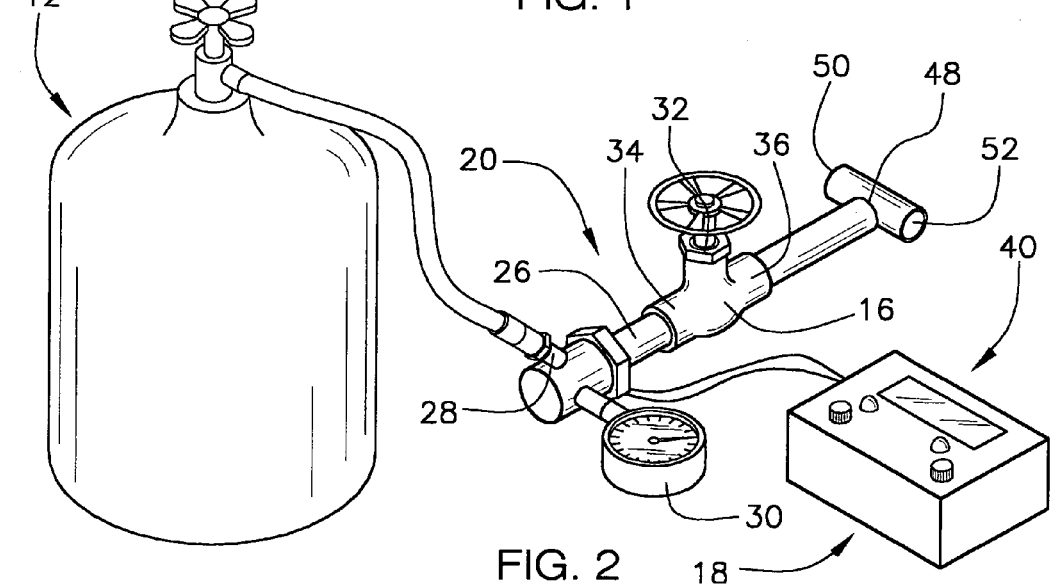
FIG. 2 is a perspective view of the present invention.
Figure 3:
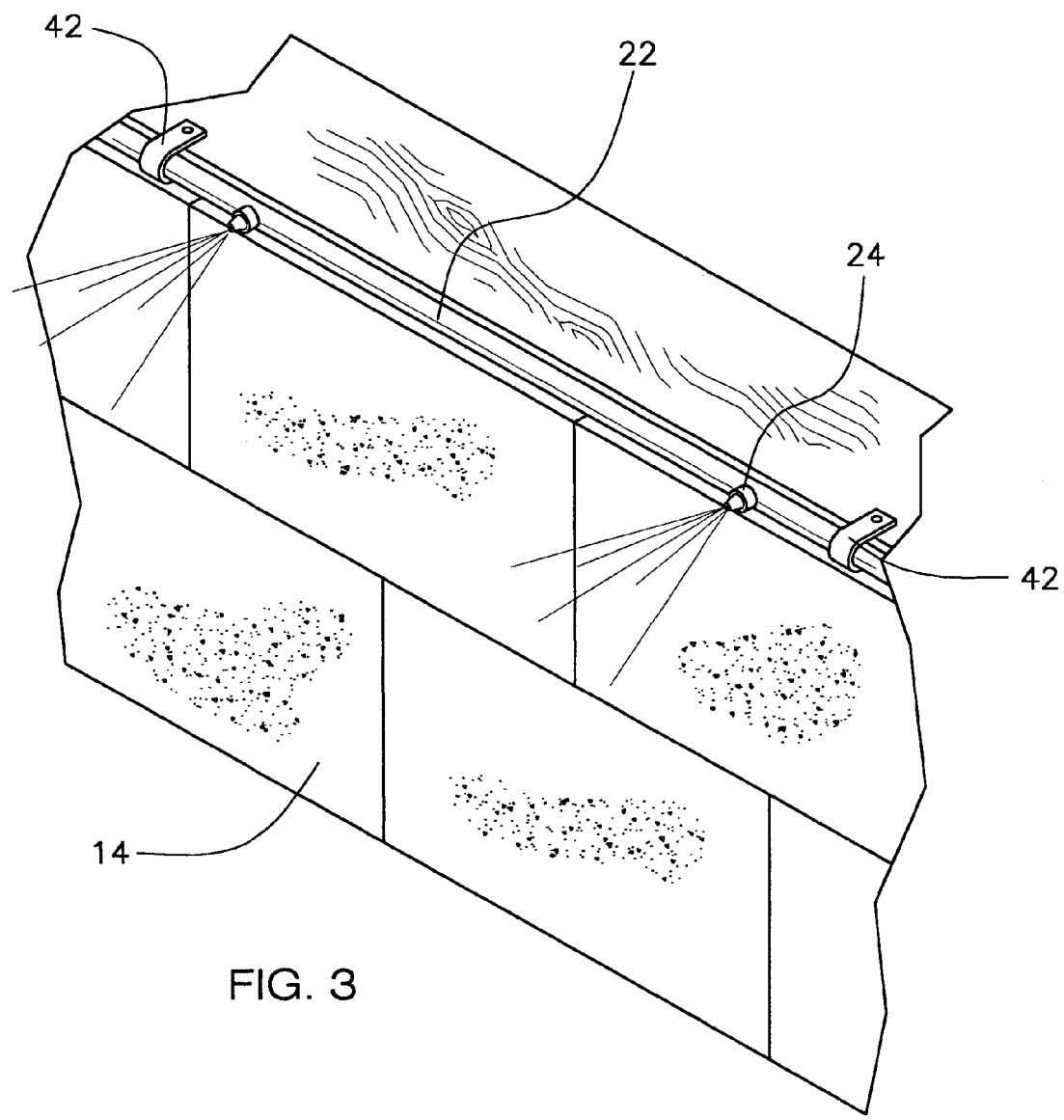
FIG. 3 is a perspective view of the present invention.

With reference now to the drawings, and in particular to FIGS. 1 through 3 thereof, a new foundation fumigation system embodying the principles and concepts of the present invention and generally designated by the reference numeral 10 will be described.

The invention is highly suitable for use on a structure, such as is shown in FIGS. 1 and 3, which includes a foundation wall that has a top with a sill plate positioned along the top of the foundation wall. The foundation wall also has an interior face that defines an interior.

As best illustrated in FIGS. 1 through 3, the foundation fumigation system 10 generally comprises a fumigant container assembly 12. The fumigant container assembly 12 contains a quality of fumigant to be applied around a foundation 14 of a structure. The fumigant container assembly 12 has a valve portion 16 for selectively releasing the fumigant. A distribution control and monitoring assembly 18 is operationally coupled to the fumigant container assembly 12. The distribution control and monitoring assembly 18 facilitates the distribution of the fumigant. A distribution system 20 is operationally coupled to the distribution control and monitoring assembly 18. The distribution system 20 has at least one distribution member 22 environmentally couplable to the fumigant container assembly 12. The distribution member 22 facilitates distributing the fumigant around the foundation 14. The distribution system 20 has a plurality of nozzle members 24. Each one of the nozzle members 24 is in environmental communication with the distribution member 22. The plurality of nozzle members 24 facilitates application of the fumigant to a surface area proximate to the foundation 14.

An inlet portion 26 is couplable to the fumigant container assembly 12. The inlet port 28 facilitates environmental communication between the fumigant container assembly 12 and the distribution control and monitoring assembly 18.

A pressure gauge 30 is operationally is coupled to the inlet port 28. The pressure gauge 30 provides a visual indication to the user of a pressure of the fumigant is supplied to the distribution control and monitoring system 18.

A control valve member 32 is for selectively environmentally coupling the distribution system 20 to the fumigant container assembly 12 such that fumigant flows from the fumigant container assembly 12 through the distribution control and monitoring assembly 18 into the distribution system 20. The control valve 32 has an valve input 34 environmentally coupled to the inlet portion 26. The control valve 32 has an valve output 36 environmentally coupled to the distribution system 20.

A plurality of sensor members 38 are positionable within the distribution system 20. The sensor members 38 detect a presence of the fumigant in sufficient quantity to indicate proper fumigant flow throughout the distribution system 20. A sensor monitoring assembly 40 is operationally coupled to each of the plurality of sensor members 38. The sensor monitoring assembly 40 provides an indication to the user of conditions detected by each one of the plurality of sensor members 38.

Each one of the clip members 42 is couplable to a portion of the distribution system 20. Each one of the clip members 42 is couplable to the structure. The plurality of clip members 42 facilitates coupling the distribution system 20 to the foundation 14.

The distribution system 20 further includes an inlet member 44 environmentally coupled to the valve output 36. The inlet member 44 is positioned through an aperture 46 in the foundation 14. A tee member 48 is environmentally coupled to the inlet member 44 the tee member 48 facilitating directing the fumigant in a first and second direction. The tee member 48 has first 50 and second 52 output ends.

A first distribution member 54 is operationally coupled to the structure. The first distribution member 54 is environmentally coupled to the first output end 50. The first distribution member 54 extends along a first portion of a first wall 56 of the structure. A first corner member 58 is environmentally coupled to a distal end 60 of the first distribution member 54. The first corner member 58 facilitates a transition around a corner of the structure.

A second distribution member 62 is operationally coupled to the structure. The second distribution member 62 has a proximal end 64 that is environmentally coupled to the first corner member 58. The second distribution member 62 extends along a second wall 68 of the structure. A second corner member 70 is environmentally coupled to a distal end 60 of the second distribution member 62. The second corner member 70 facilitates a transition around a second corner of the structure.

A third distribution member 72 is operationally coupled to the structure. The third distribution member 72 has a proximal end 64 environmentally coupled to the second corner member 70. The third distribution member 72 extends along a third wall 74 of the structure. A third corner member 76 is environmentally coupled to a distal end 60 of the third distribution member 72. The third corner member 76 facilitating a transition around a third corner of the structure.

A fourth distribution member 78 is operationally coupled to the structure. The fourth distribution member 78 has a proximal end 64 environmentally coupled to the third corner member 76. The fourth distribution member 78 extends along a fourth wall 11 of the structure. A fourth corner member 13 is environmentally coupled to a distal end 60 of the fourth distribution member 78. The fourth corner member 13 facilitates a transition around a fourth corner of the structure.

A fifth distribution member 15 is operationally coupled to the structure. The fifth distribution member 15 has a proximal end 64 environmentally coupled to the fourth corner member 13. The fourth distribution member 78 extends along a second portion of the first wall 56 of the structure. The fifth distribution member 15 has a distal end 60 environmentally coupled to the second output end 52 of the tee member 48 whereby the distribution members form a loop.

The plurality of sensor members 38 further includes four sensor members 38. Each one of the sensor members 38 is positioned within an associated one of the corner members such that full distribution along the distribution system 20 is determinable. Each one of the sensor members 38 detects a pressure of the fumigant within the distribution system 20. The fumigant includes an insecticide.

In use, the user would install the system around the perimeter of the exterior walls of a structure at a point just above the sill plate. A central valve member would distribute the fumigation liquid through the distribution members and out the nozzles located along the distribution members.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A foundation fumigation system comprising:
    a structure including a foundation wall, said foundation wall having a top with a sill plate positioned along the top of the foundation wall, the foundation wall having an interior face defining an interior;
    a fumigant container assembly, said fumigant container assembly containing a quantity of fumigant to be applied along the interior face of the foundation wall of said structure, said fumigant container assembly having a valve portion for selectively releasing said fumigant;
    a distribution control and monitoring assembly operationally coupled to said fumigant container assembly, said distribution control and monitoring assembly facilitating distribution of said fumigant; and
    a distribution system operationally coupled to said distribution control and monitoring assembly, said distribution system having at least one distribution member environmentally couplable to said fumigant container assembly, said at least one distribution member being positioned on the interior face of said foundation wall so as to be capable of distributing said fumigant along the foundation wall, said distribution system having a plurality of nozzle members, each one of said nozzle members being in environmental communication with said distribution member, each of said nozzle members being positioned along the interior face of said foundation wall and being oriented to spray said fumigant toward the interior of said foundation wall, said plurality of nozzle members facilitating application of said fumigant to a surface area proximate to the foundation wall of said structure;
    wherein an inlet port is couplable to said fumigant container assembly, said inlet port facilitating environmental communication between said fumigant container assembly and said distribution control and monitoring assembly;
    a pressure gauge operationally coupled to said inlet port, said pressure gauge providing a visual indication to the user of a pressure of said fumigant being supplied to said distribution control and monitoring system; and a control valve member for selectively environmentally coupling said distribution system to said fumigant container assembly such that fumigant flows from said fumigant container assembly through said distribution control and monitoring assembly into said distribution system, said control valve member being located outside of said foundation wall, said control valve member having a valve input environmentally coupled to said inlet portion, said control valve member having a valve output environmentally coupled to said distribution system;

wherein a plurality of sensor members are positioned within said distribution system, said sensor members detecting a presence of said fumigant in sufficient quantity to indicate proper fumigant flow throughout said distribution system, a sensor monitoring assembly operationally coupled to each of said plurality of sensor members, said sensor monitoring assembly providing an indication to the user of conditions detected by each one of said plurality of sensor members, said sensor monitoring assembly being located outside of said foundation wall;

a plurality of clip members, each one of said clip members being coupled to a portion of said distribution system, each one of said clip members being coupled to the sill plate of the structure to position said distribution system adjacent to the foundation wall;

wherein said distribution system further comprises:

an inlet member environmentally coupled to said valve output, said inlet member extending through an aperture in the foundation wall;

a tee member environmentally coupled to said inlet member said tee member facilitating directing said fumigant in a first and second direction along the interior face of said foundation wall, said tee member having first and second output ends;

a first distribution member coupled to and extending along the interior face of the foundation wall of said structure, said first distribution member being environmentally coupled to said first output end of said tee member, said first distribution member extending along a first portion of the foundation wall of said structure;

a first corner member being environmentally coupled to a distal end of said first distribution member, said first corner member being coupled to the interior face of said foundation wall and facilitating a transition along a corner of the foundation wall of said structure;

a second distribution member coupled to and extending along the interior face of the foundation wall of said structure, said second distribution member having a proximal end environmentally coupled to said first corner member, said second distribution member extending along a second portion of the foundation wall of said structure;

a second corner member being environmentally coupled to a distal end of said second distribution member, said second corner member being coupled to the interior face of said foundation wall and facilitating a transition along a second corner of the foundation wall of said structure;

a third distribution member coupled to and extending along the interior face of the foundation wall of said structure) said third distribution member having a proximal end environmentally coupled to said second corner member, said third distribution member extending along a third portion of the foundation wall of said structure;

a third corner member being environmentally coupled to a distal end of said third distribution member, said third corner member being coupled to the interior face of said foundation wall and facilitating a transition along a third corner of the foundation wall of said structure;

a fourth distribution member coupled to and extending along the interior face of the foundation wall of said structure, said fourth distribution member having a proximal end environmentally coupled to said third corner member, said fourth distribution member extending along a fourth portion of the foundation wall of said structure;

a fourth corner member being environmentally coupled to a distal end of said fourth distribution member, said fourth corner member being coupled to the interior face of said foundation wall and facilitating a transition along a fourth corner of the foundation wall of said structure; and a fifth distribution member coupled to and extending along the interior face of the foundation wall of said structure, said fifth distribution member having a proximal end environmentally coupled to said fourth corner member, said fourth distribution member extending along a fifth portion of the foundation wall of said structure, said fifth distribution member having a distal end environmentally coupled to said second output end of said tee member, said distribution members forming a loop in the interior of said foundation wall.

2. The system of claim 1, wherein said plurality of sensor members further comprises four sensor members, each one of said sensor members being positioned within an associated one of said corner members such that full distribution along said distribution system is determinable.

3. The system of claim 1, wherein each one of said sensor members detects a pressure of said fumigant within said distribution system.

4. The system of claim 1, wherein said fumigant comprises an insecticide.

* * * * *